Figure 1:
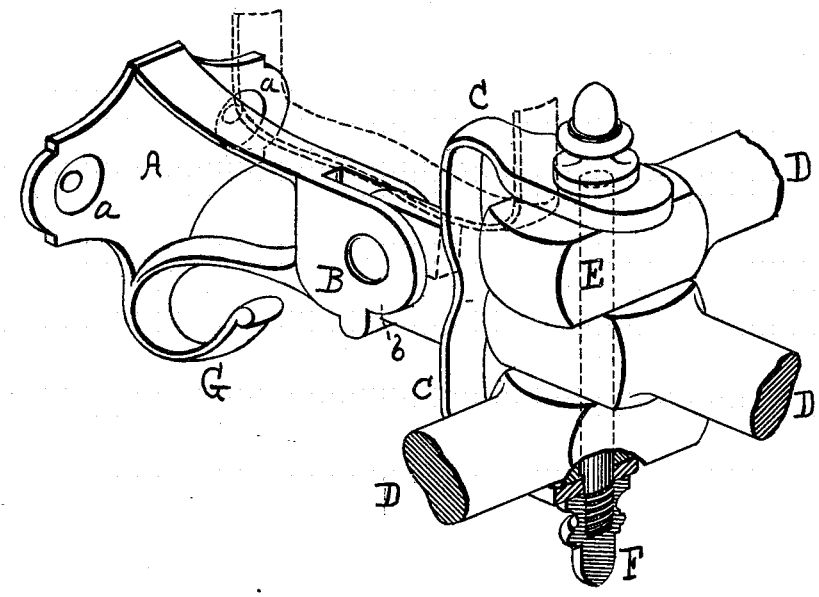

C. A. BRICKLEY.
TOWEL RACK.

No. 191,564. Patented June 5, 1877.

WITNESSES.
Wm B. W. Hallett
Nelson E. Church

INVENTOR.
Charles A. Brickley
by Pierce & Hallett
ATTORNEYS

UNITED STATES PATENT OFFICE.

CHARLES A. BRICKLEY, OF PROVIDENCE, RHODE ISLAND.

IMPROVEMENT IN TOWEL-RACKS.

Specification forming part of Letters Patent No. 191,564, dated June 5, 1877; application filed October 30, 1876.

*To all whom it may concern:*

Be it known that I, CHARLES A. BRICKLEY, of the city and county of Providence, in the State of Rhode Island, have invented a new Improvement in Towel-Racks; and declare the following to be a specification thereof, reference being had to the accompanying drawing.

Figure 1 is a perspective view of my invention.

My invention consists, essentially, in providing the bracket with a hinge, by means of which the rods may be turned upwardly; and, also, in making the bolt upon which the rods swing detachable by means of a nut, so that the bolt may be removed for the purpose of substituting new rods for those which become broken or otherwise injured.

The bracket A is fastened to the wall or other support by means of screws or nails passing through the openings a. It terminates with a joint, B, which receives within itself the clamp C, and these are riveted together to form a hinge, as shown in Fig. 1. The clamp C at this point is furnished with a shoulder, b, to prevent the hinge from turning downward too far. The rods D are pivoted upon the bolt E, which passes through them. The bolt E has a nut, F, and when the nut is removed the bolt can be withdrawn from the rod, for the purpose aforesaid. A hook, G, extends from the bottom of the bracket A.

The position of the clamp, when turned upward, is indicated in the drawing by dotted lines.

I am aware of the invention of J. A. Reynolds, described in Letters Patent of the United States No. 158,739, and, therefore, do not claim, broadly, the hinging of the clamp to the bracket.

I claim as a novel and useful invention, and desire to secure by Letters Patent—

1. The detachable bolt E, with its nut F, in combination with the clamp C and rods D of a towel-rack, substantially as and for the purpose specified.

2. The hinge B, having a horizontal pivot-pin, and provided with the shoulder b, in combination with the bracket A and clamp C, having a vertical pin, E, substantially as and for the purpose specified.

3. The improved towel-rack herein described, consisting of the bracket A, hinge B, clamp C, rods D, bolt E, nut F, and hook G, all combined substantially as described, and for the purpose specified.

CHARLES A. BRICKLEY.

Witnesses:
NELSON E. CHURCH,
WARREN R. PERCE.